Figure 1:
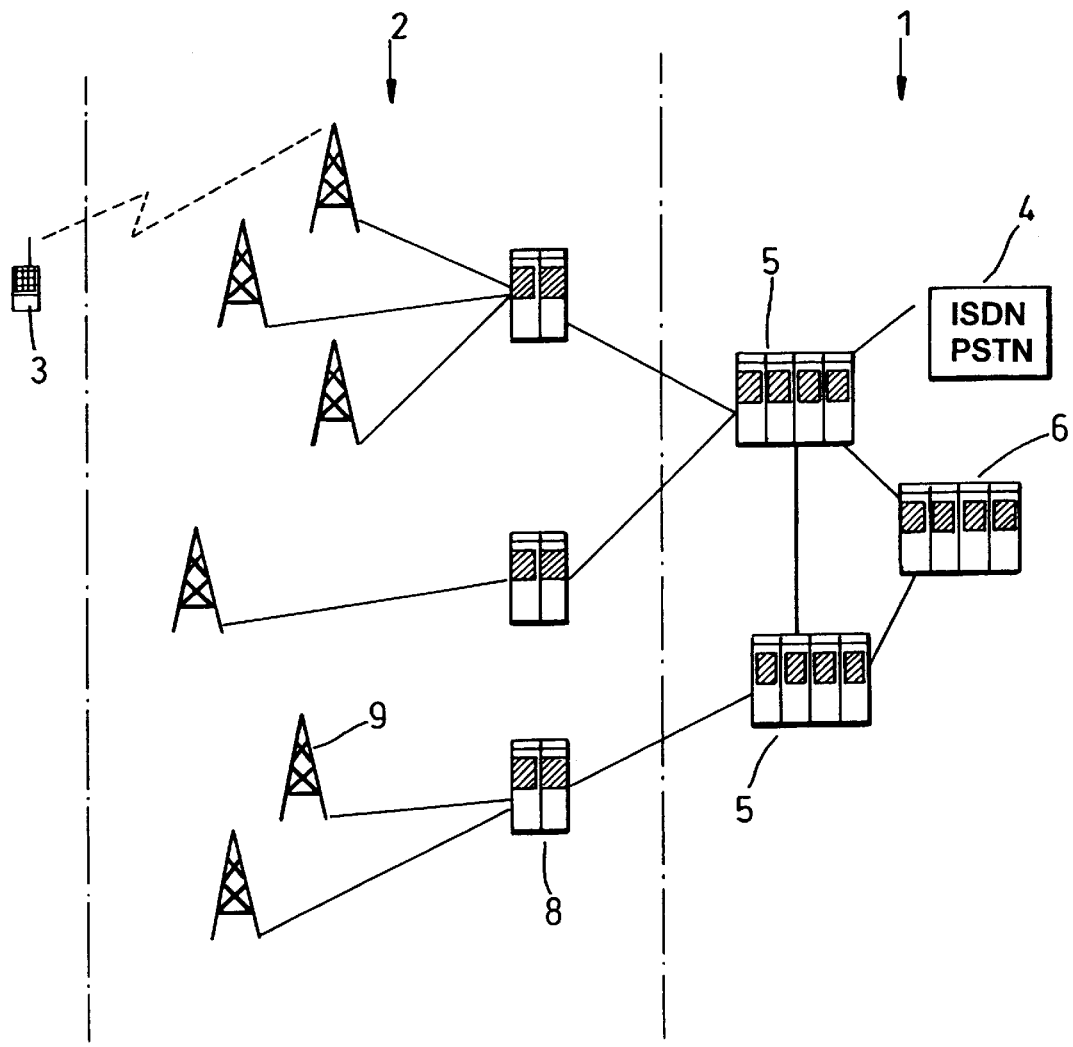

United States Patent [19]

Abbadessa

[11] Patent Number: 6,088,587
[45] Date of Patent: Jul. 11, 2000

[54] NETWORK DISCOVERY METHOD AND APPARATUS FOR CELLULAR MOBILE RADIO NETWORKS

[75] Inventor: Daniele Abbadessa, Redland, United Kingdom

[73] Assignee: Hewlett-Packard Company, Palo Alto, Calif.

[21] Appl. No.: 08/988,466

[22] Filed: Dec. 10, 1997

[30] Foreign Application Priority Data

Dec. 11, 1996 [EP] European Pat. Off. ............. 96308986

[51] Int. Cl.[7] ............................. H04Q 7/20; G01R 31/08; H04B 7/216
[52] U.S. Cl. ........................... 455/424; 455/562; 370/328
[58] Field of Search ..................................... 455/437, 436, 455/439, 517, 524, 424, 562; 379/12, 23, 225, 219, 232; 370/252, 241, 329, 331, 333, 328

[56] References Cited

U.S. PATENT DOCUMENTS

| | | | |
|---|---|---|---|
| 5,278,890 | 1/1994 | Beeson, Jr. et al. | 370/328 |
| 5,347,546 | 9/1994 | Abadi et al. | 375/75 |
| 5,521,902 | 5/1996 | Ferguson . | |
| 5,550,914 | 8/1996 | Clarke et al. | 379/230 |
| 5,793,752 | 8/1998 | Clarke et al. | 370/252 |
| 5,884,175 | 3/1999 | Schiefer et al. | 455/436 |

FOREIGN PATENT DOCUMENTS

0710043A1 10/1994 European Pat. Off. .
0738091A1 4/1995 European Pat. Off. .

OTHER PUBLICATIONS

European Search Report, EP 96 30 8986, Jun. 4, 1997.

ITG Specialist Report, No. 124, Sep. 1993, "GSM Signalling in Practice", pp. 1–13, Fingerle, (English translation provided).

*Primary Examiner*—Edward F. Urban
*Assistant Examiner*—Sheila Smith

[57] ABSTRACT

A method and apparatus are provided for monitoring a cellular mobile radio system and for identifying monitored radio elements within the network with respect to other network entities. The logical and physical topology of a cellular mobile radio system is determined by monitoring messages passed across a communications interface in the system. Embodiments of the invention associate common information occurring in different messages, and over time, establish the topology of a network, even though messages passed across the monitored interface do not comprise unique system-wide addressing information. In particular, the present method provides a mapping between radio elements (TRX) and other network entities (TEI, CI, and LAI) in a GSM type cellular system by monitoring messages across the Abis and A interfaces.

18 Claims, 14 Drawing Sheets

NETWORK DISCOVERY METHOD AND APPARATUS FOR CELLULAR MOBILE RADIO NETWORKS

The present invention relates to a network discovery method and apparatus for a cellular mobile radio network, and in particular to a network discovery method and apparatus for identifying radio elements within such a network.

The present invention has particular application to cellular mobile radio systems operating according to the GSM, DCS1800, or the PCS1900 standards. Systems operating according to these standards, including derivatives thereof, will hereinafter be referred to as "GSM-type" systems. It should, however, be noted that the present invention is not restricted to a GSM-type system.

Cellular mobile radio systems, such as GSM-type systems, comprise a fixed part having switching elements and radio elements providing radio coverage in a plurality of cells, and mobile stations for communicating with the fixed part of the system. Cells are often logically grouped into location areas. Within each cell, radio coverage is provided by one or more radio elements, which, in the case of GSM-type systems, comprise elementary transceivers termed TRXs (Transmitter Receiver). Radio elements are grouped within Base Transceiver Stations (BTS) which communicate with Base Station Controllers (BSC). The interface between a BTS and BSC, within a GSM-type system, is referred to as the Abis interface, and individual links (generally comprising two physical channels) on this interface are termed Abis links. BSCs communicate with mobile switching centres (MSC) via what is termed the A interface.

In order to monitor, and optimise, the performance of a cellular mobile radio system it is often necessary to determine the topology of the network. Although this information may be derived from switching elements, such as BSCs and their related databases, within the fixed part of the network, there are problems in doing so. Firstly, although many aspects of GSM-type networks have been standardized, there are some areas in which equipment manufacturers have a number of technological choices which will meet the relevant standards, and other areas in which standardization has not been enforced. An area which is not highly standardized is that of Operation and Maintenance (O & M) messages. Thus in order to access O & M messages a specific, proprietary format which is unique to an equipment manufacturer may be required. Secondly, due to the highly sensitive nature of some information stored within the fixed part of a network, a network operator severely restricts access to databases associated with network switching elements such as BSCs and MSCs. Finally, there is no guarantee that the information stored within databases associated with switching elements is up to date, since changes made to the system may not have been incorporated into these databases.

It is known to carry out independent monitoring of the signalling network of a cellular mobile radio network, for example by temporarily or permanently installing monitor probes on one or more links to monitor messages flowing on the link or links. A number of techniques are known for monitoring signalling messages in order to determine various parameters of a cellular mobile radio system. For example, European patent application 0 710 043 discloses a technique for determining the location area information for cells within a GSM-type network, and European application 0 658 032 (U.S. Pat. No. 5,521,902) discloses a technique for identifying the A interface link on which a monitor probe is installed. A technique for determining the functionality of nodes of a network is disclosed in European patent application 0 738 091. This technique relies on the monitoring of signalling messages which include addressing information associating the messages with specific nodes, as is for example the case for SS7 (Signalling System No. 7) links.

According to the present invention, there is provided a network discovery method for determining information about a cellular mobile radio network comprising a fixed part having switching elements and radio elements providing radio coverage in a plurality of cells, each cell having at least one said radio element, and mobile stations for communicating with said fixed part via the radio elements, the method comprising: monitoring signalling messages passed between the radio elements and the switching elements, selecting at least one signalling message in accordance to predetermined selection criteria, extracting data from said at least one message, correlating said extracted data with previously extracted data and, repeating said selecting, extracting and correlating steps until each monitored radio element is identified with respect to other network entities.

The present applicant has appreciated that in order to identify radio elements, the correlation of data extracted from a plurality of signalling messages passed between radio elements and switching elements is required. For GSM-type networks, this requirement stems from the absence of unique network wide addressing information on the Abis interface between radio elements or TRXs, and the BSC. Whereas the SS7 protocols utilised on the A interface provide for the unique identification of A interface links, no such provision is made for Abis links. On the A interface, links have an identification which is given by the Originating Point Code, the Destination Point Code and the Signalling Link Code. Abis interface links have no such identification provided by protocol. Abis interface links are identified implicitly by configuration information stored within the BSC, and TRXs are addressed by using an identifier (a TEI—Terminal Endpoint Identifier) which is allocated by the BSC. Embodiments of the present invention provide a technique for building up information on radio elements until their topological relationship to other network entities can be identified. Such information once determined can be used for many purposes. For example it can be used to compare the level of network resources available to the current level of usage of these resources.

Although data may be extracted from a single message may usefully be used in the present network discovery technique, preferably a pair of signalling messages are selected in accordance with predetermined selection criteria.

Often, cells within a mobile radio network are logically grouped into location areas, and in this case a radio element is preferably identified by the cell within which it resides, and the location area within which the cell resides. In embodiments of the present invention, this hierarchical identification by network entity provides a logical identifier for each radio element. A physical identifier, provided by the monitoring system may be correlated with this logical identifier.

Preferably the predetermined selection criteria for selecting a pair of messages are, firstly that each message is of a different message type, and secondly that the messages contain at least one information element in common. Advantageously, there is provided a further matching step in which the common information element in each of the messages is compared and data from the pair of messages is only utilised in said correlating step if the common information element in each message is identical.

Preferably data from a pair of messages is only utilised in identifying radio elements if the messages are monitored within a predetermined time period of each other. It is difficult to identify messages on the Abis interface which relate to the same transaction, because signalling messages on the Abis interface do not carry unique identification information. By utilising only messages which are monitored within a pre-determined period of each other, the likelihood that these messages belong to the same transaction is increased. Preferably the time period is one which is typical for the time interval between the messages being monitored.

Preferably, in addition to monitoring signalling messages between radio elements and switching elements, messages passed between two switching elements are also monitored. Thus, in GSM-type networks signalling messages on the A interface, in addition to the Abis interface, are monitored.

According to a second aspect of the present invention, there is provided apparatus for identifying the relationship between radio elements and other network entities within a cellular mobile radio network, the network comprising a fixed part having switching elements and radio elements providing radio coverage in a plurality of cells, each cell having at least one said radio element, and mobile stations for communicating with said fixed part via the radio elements, the apparatus comprising: probe means for monitoring signalling messages passed between an identified one of the radio elements and the switching elements, extracting means for extracting data from predetermined signalling messages, analysis means for determining from extracted data a relationship between the monitored radio element and other network entities.

Figure 2:
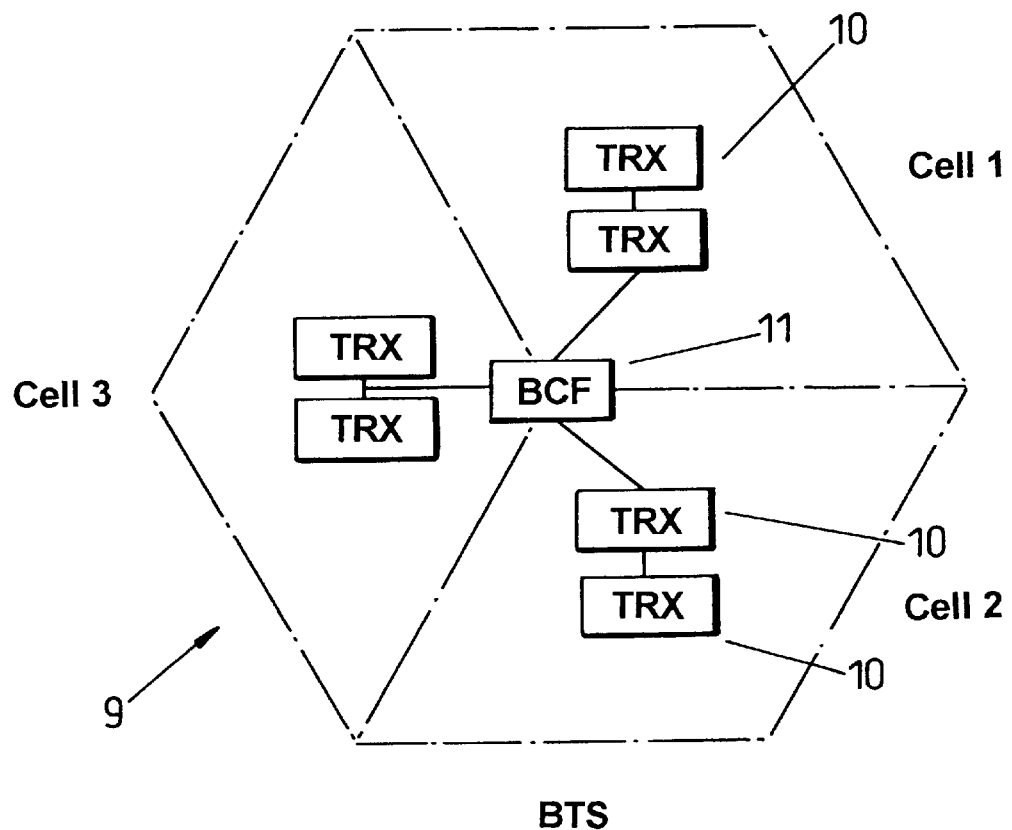
Figure 3:
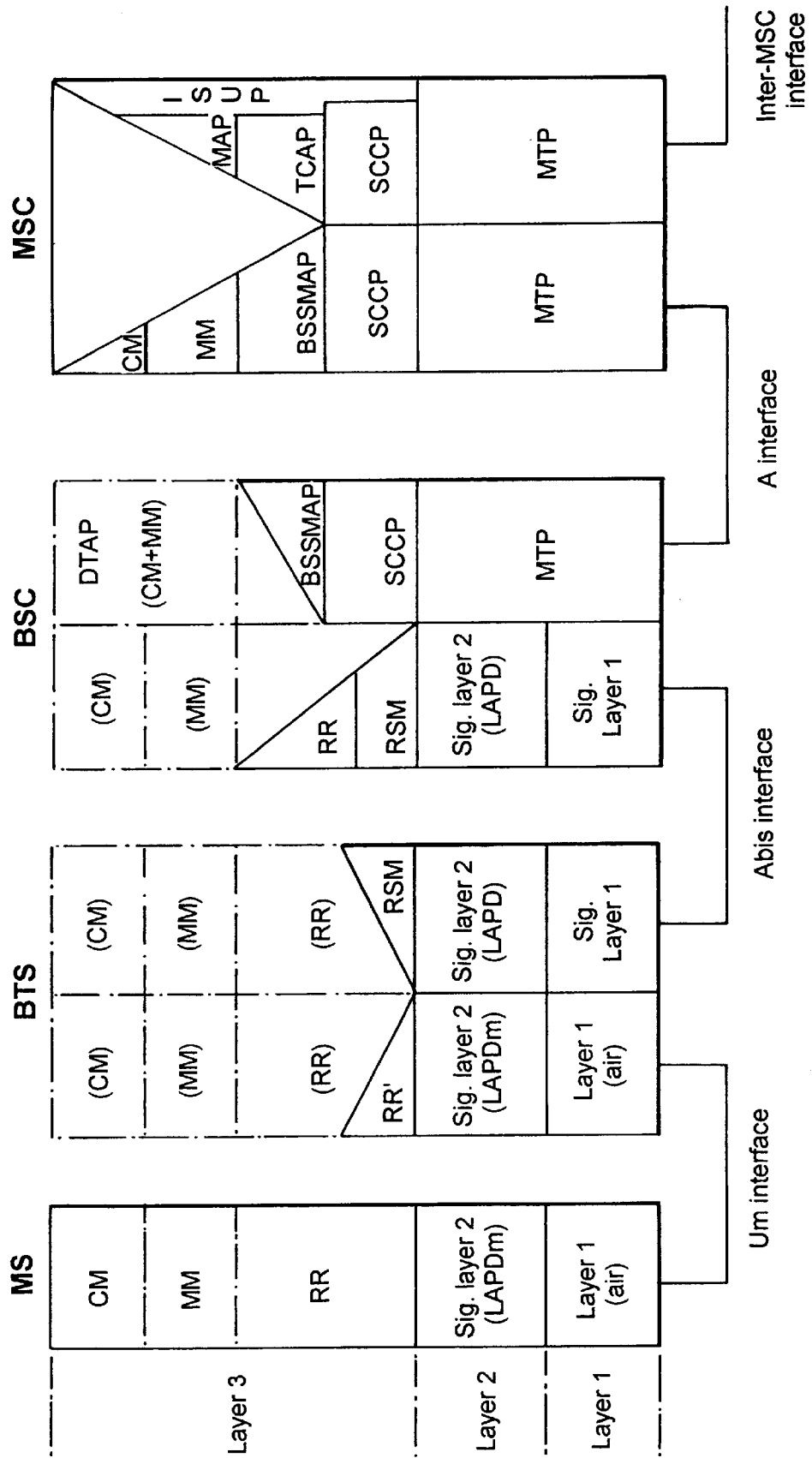
Figure 4:
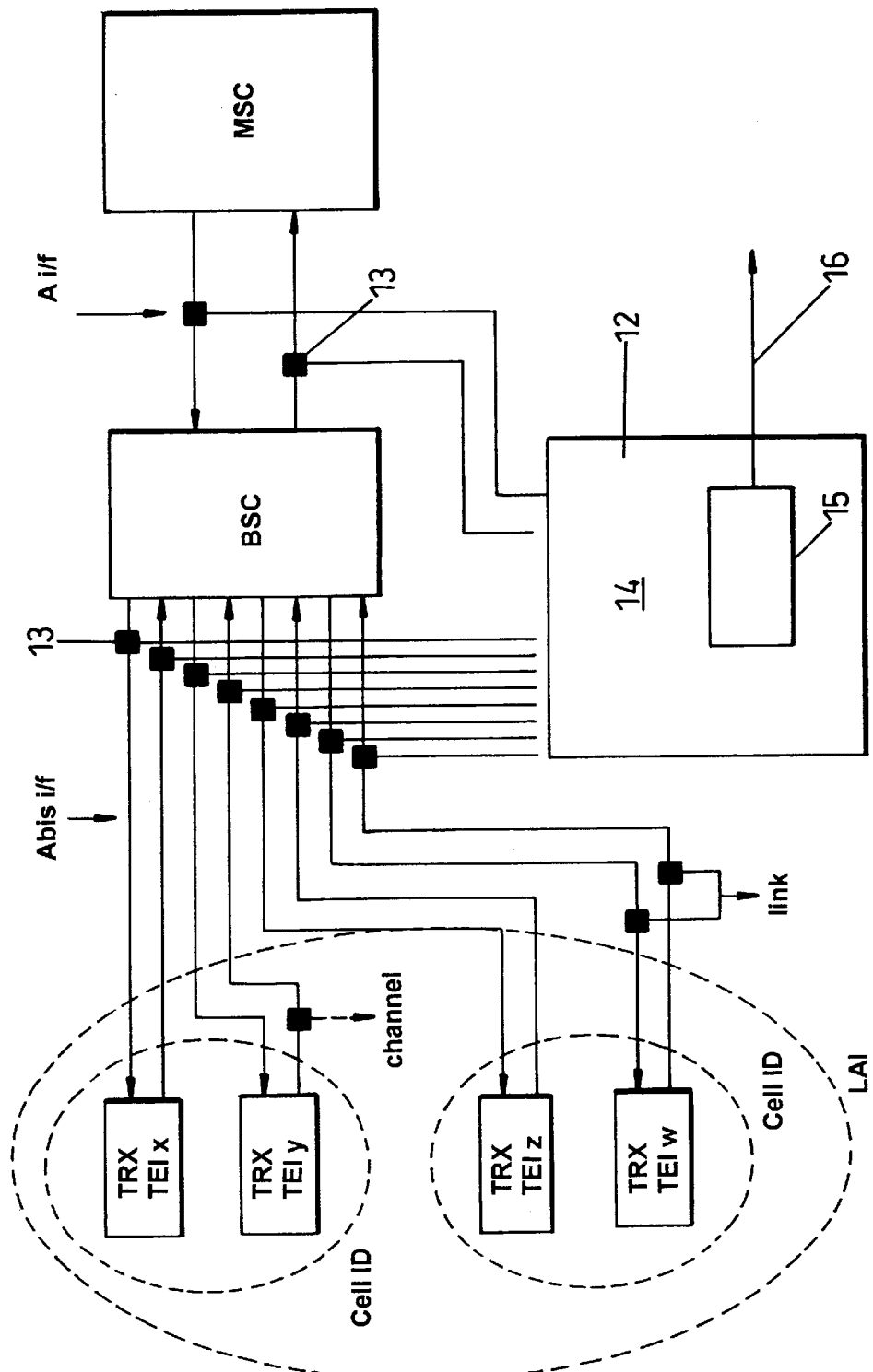
Figure 5:
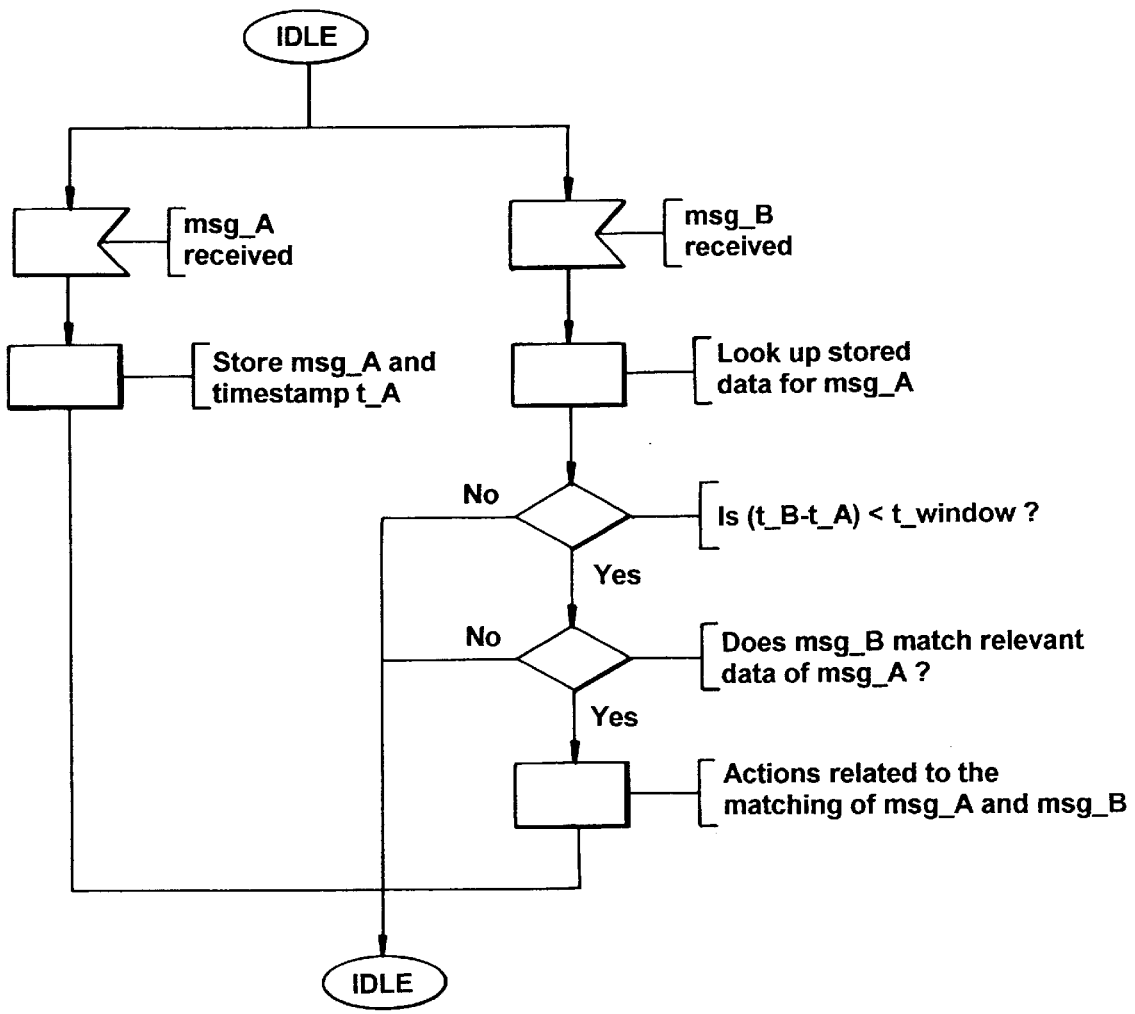
Figure 6:
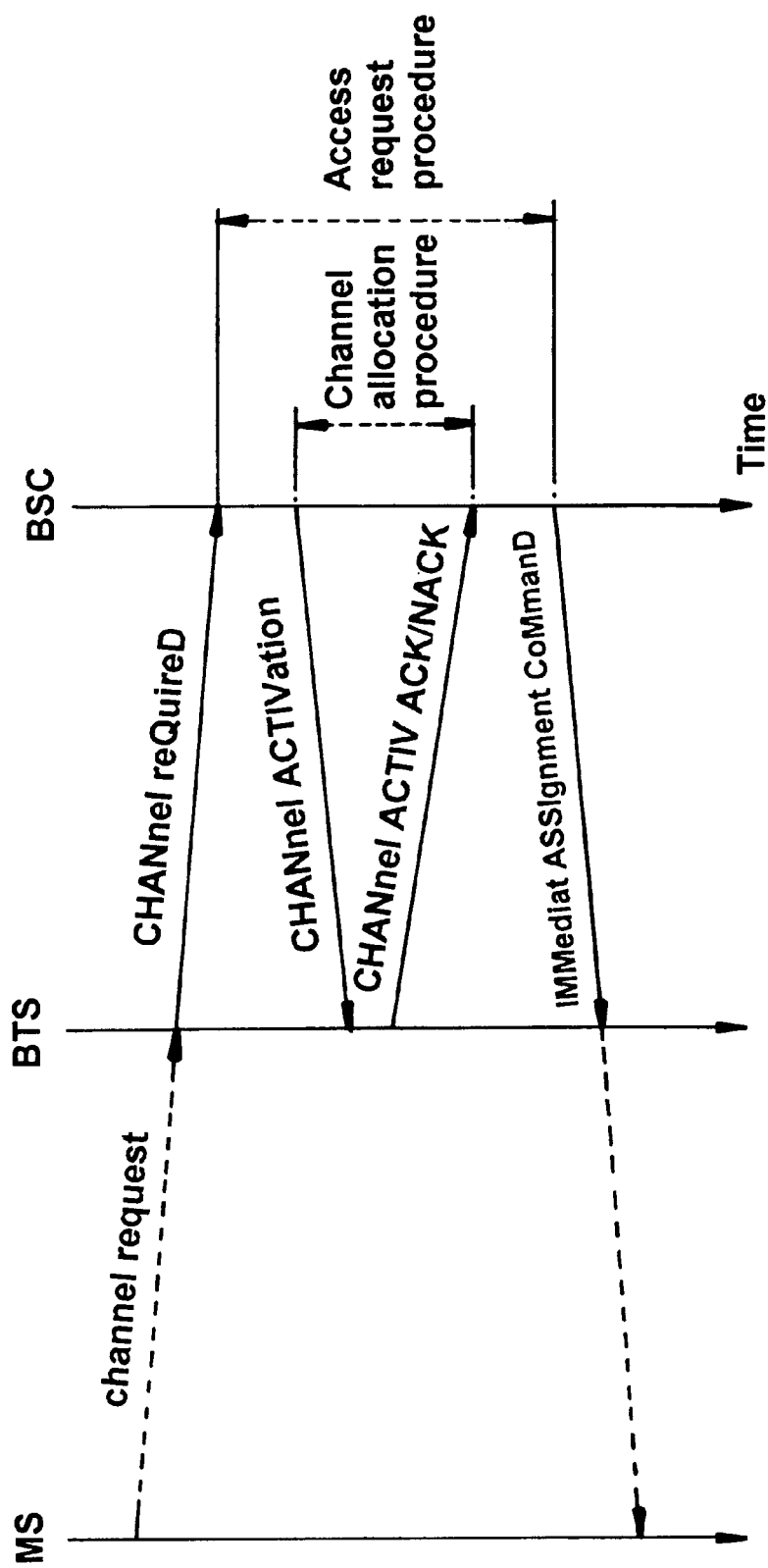
Figure 7:
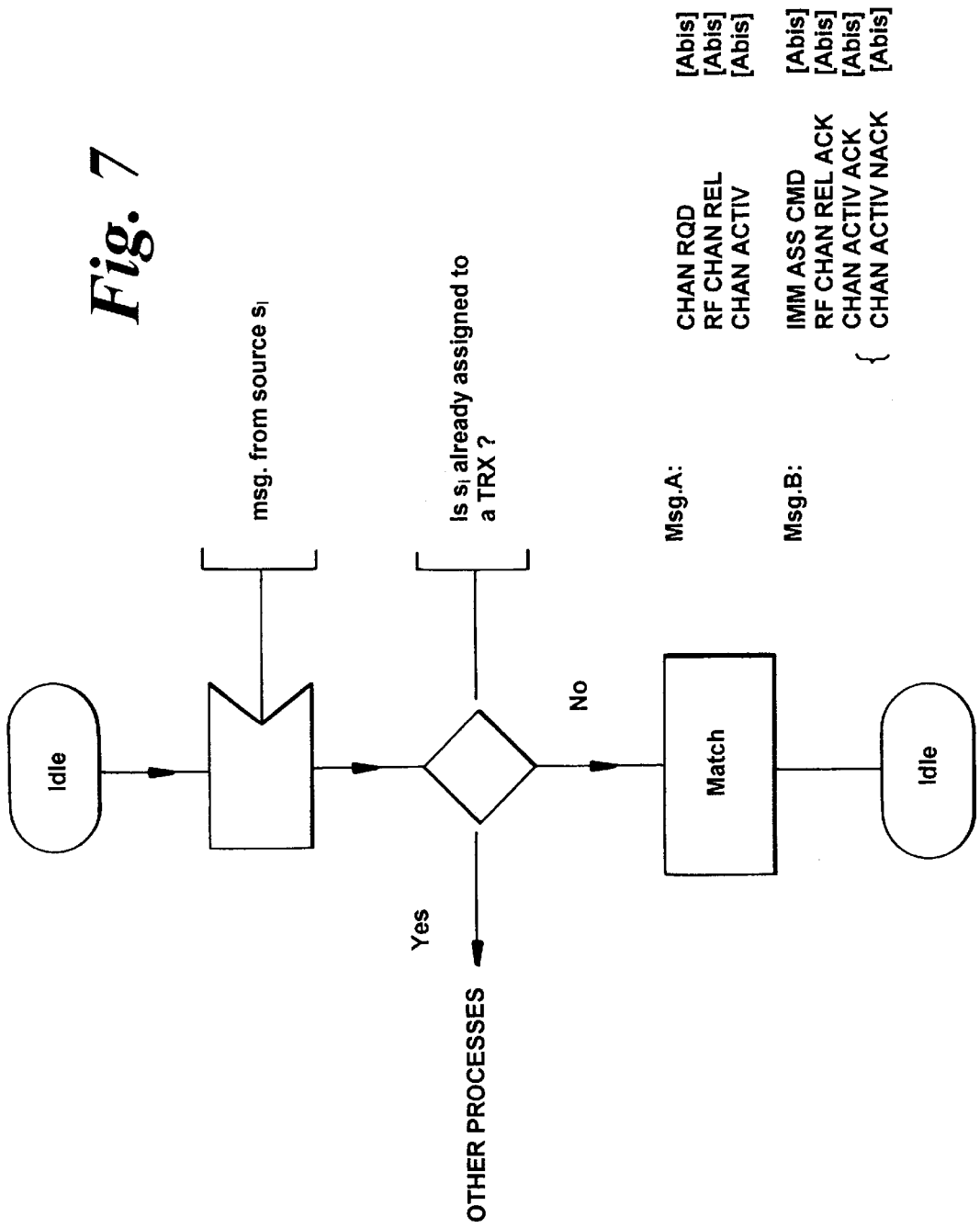
Figure 8:
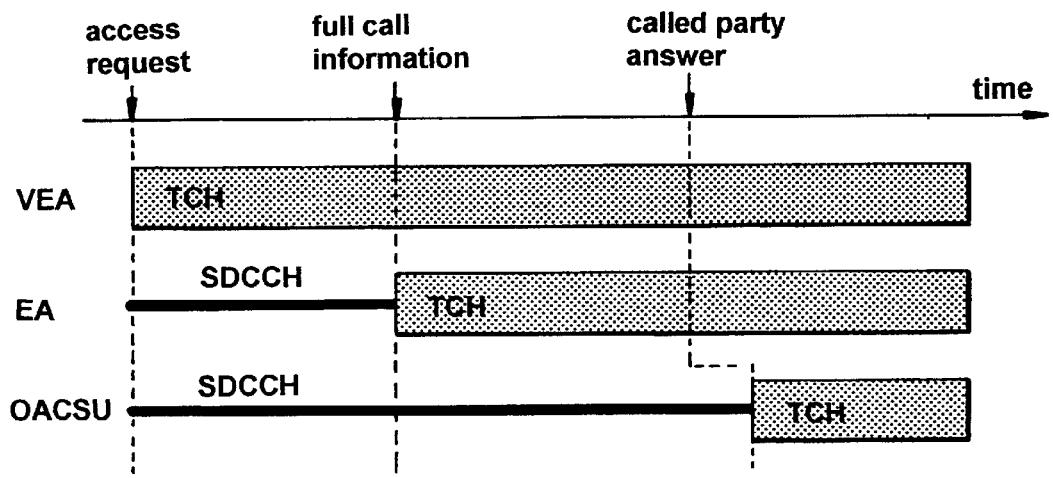
Figure 9:
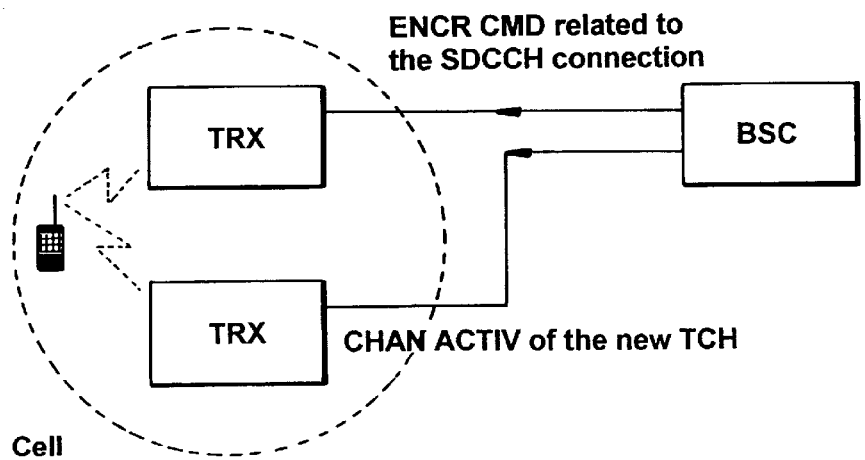
Figure 10:
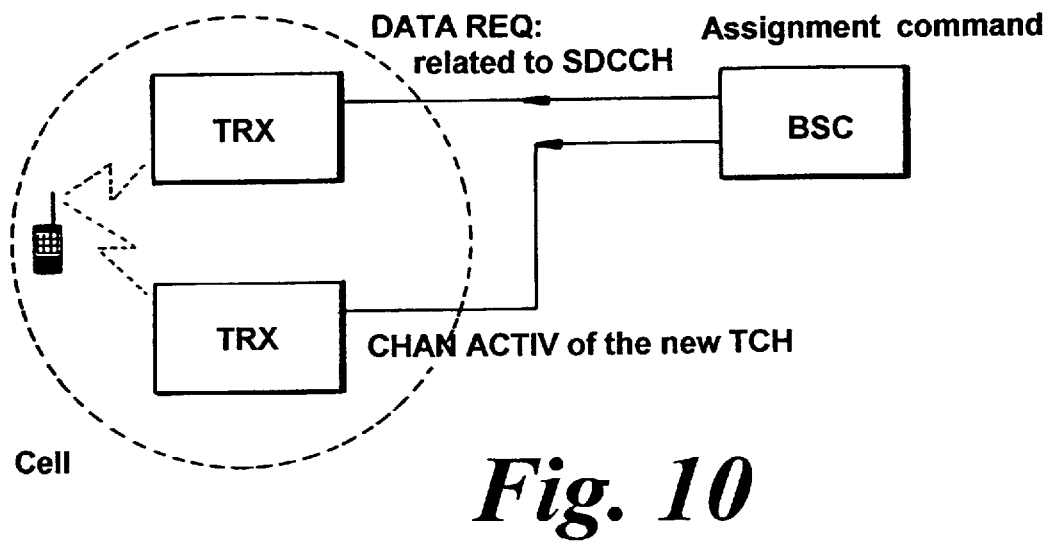
Figure 11:
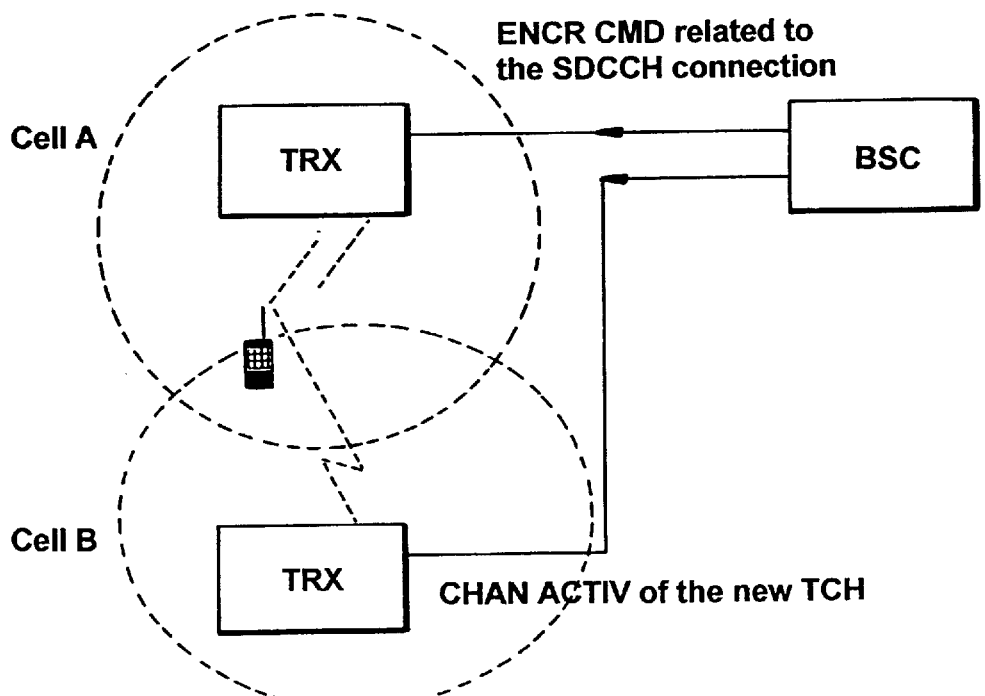
Figure 12:
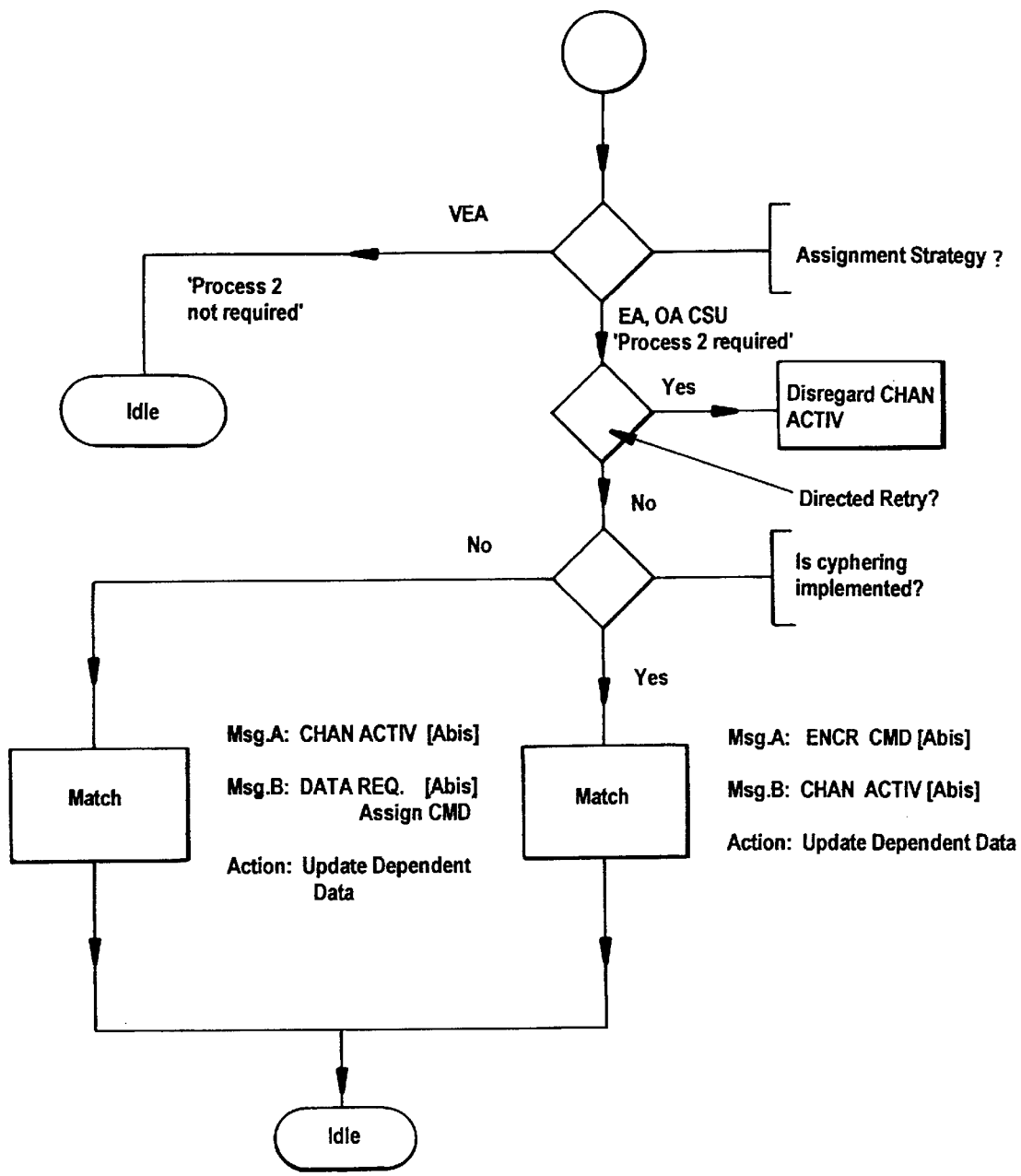
Figure 13:
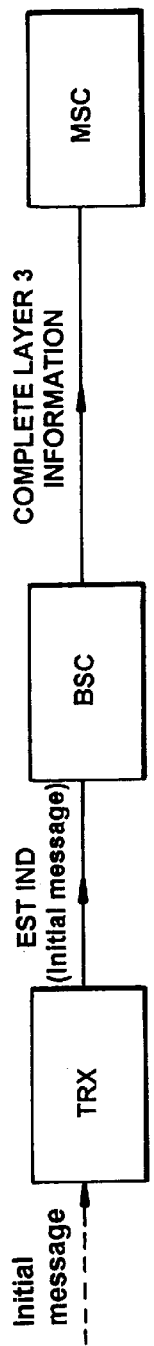
Figure 14:
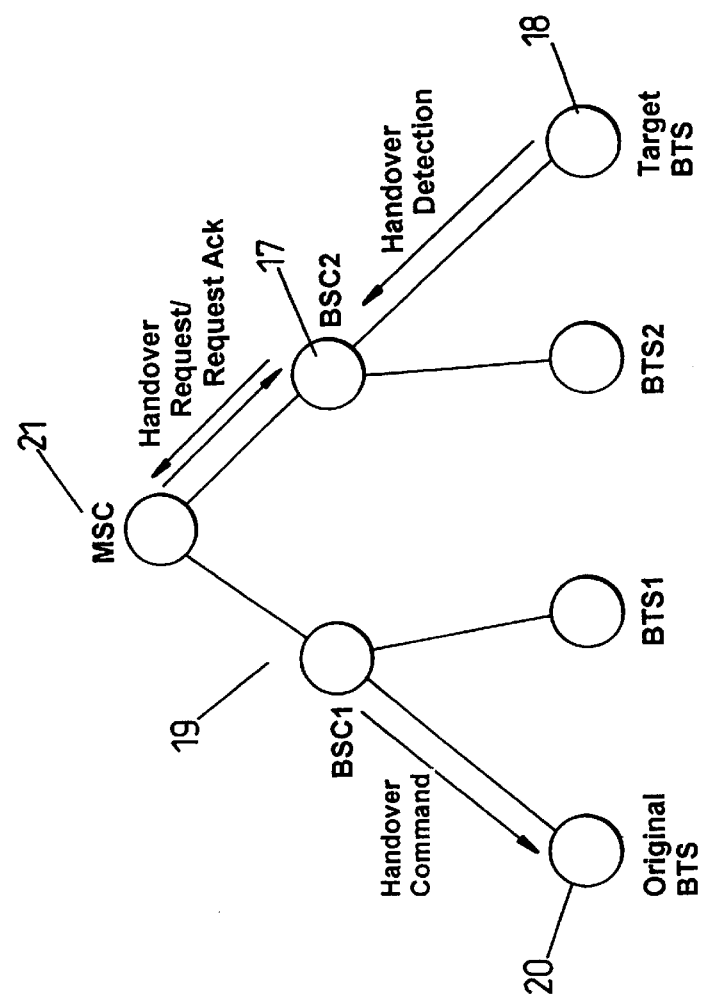
Figure 15:
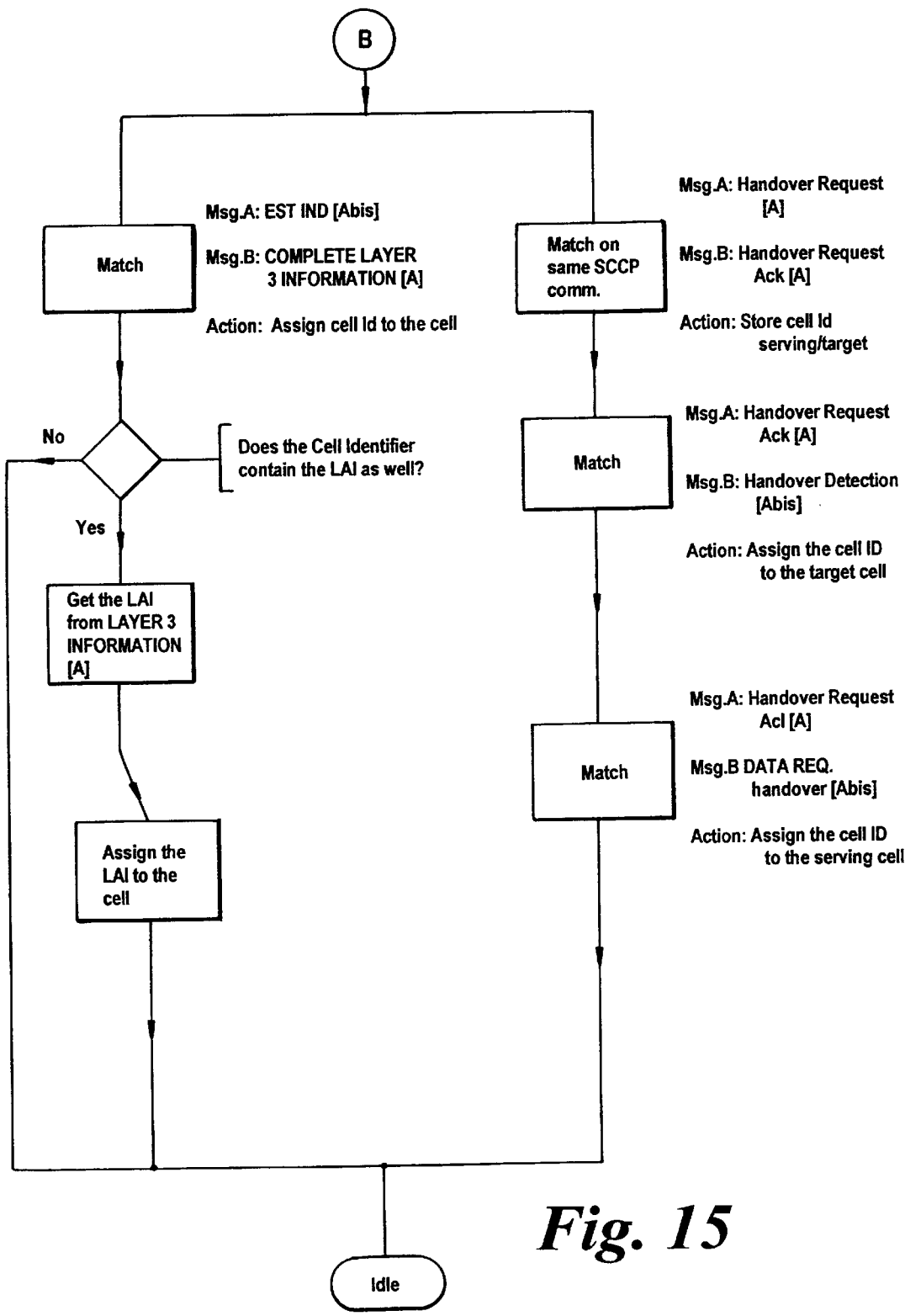
Figure 16:
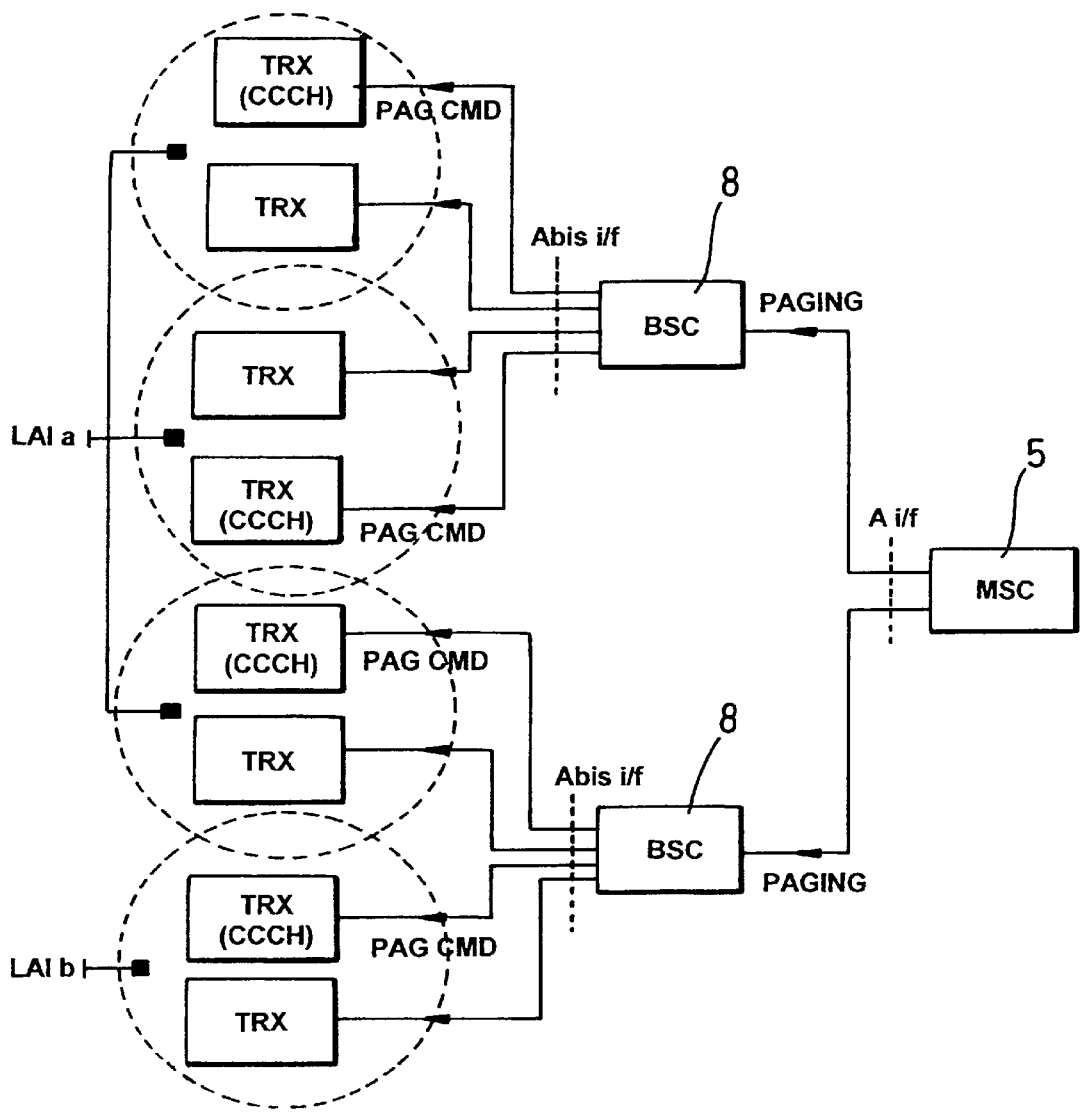
Figure 17:
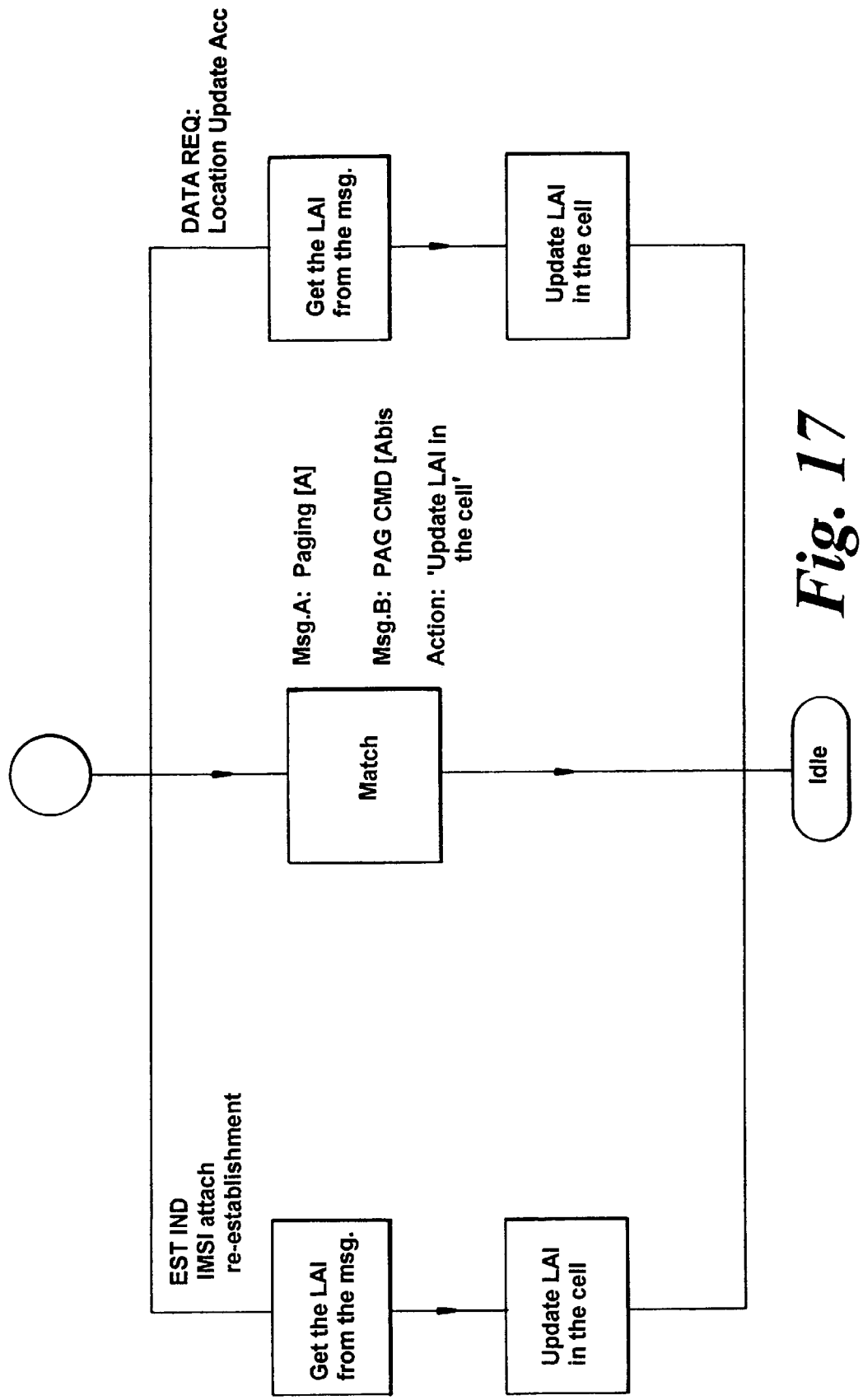

Embodiments of the present invention will now be described, by way of example only, and with reference to the following drawings in which:

FIG. 1 is a schematic diagram of a GSM-type mobile communications network,

FIG. 2 is a schematic diagram of a three sector BTS showing the TRXs serving each cell, FIG. 3 is diagram showing the relationships between various protocols used in GSM networks, FIG. 4 is a schematic diagram of a monitoring system according to embodiments of the present invention showing its connections to a mobile network, FIG. 5 is a flowchart of the message matching procedure utilised in embodiments of the present invention, FIG. 6 is a schematic diagram showing the sequence of messages generated during the request for a channel by an MS, and the subsequent allocation of a channel by a BSC in a GSM mobile network, FIG. 7 is a flowchart of the steps taken and the messages utilised during the TRX discovery procedures of embodiments of the present invention, FIG. 8 is a schematic diagram showing the channel allocation strategies available to operators of GSM mobile networks, FIG. 9 is a schematic diagram showing messages, sent to a pair of TRXs, which can be used to aggregate the TRXs according to embodiments of the present invention when ciphering has been implemented by a network operator, FIG. 10 is a schematic diagram showing messages, sent to a pair of TRXs, which can be used to aggregate the TRXs according to embodiments of the present invention whether or not ciphering has been implemented by a network operator, FIG. 11 is a schematic diagram showing a "directed retry", in which a traffic channel from a TRX which is not within the MS's current cell is allocated to the MS, FIG. 12 is a flowchart of the steps taken and the messages utilised during the TRX aggregation procedures of embodiments of the present invention, FIG. 13 is a schematic diagram showing the sequence of messages sent as a consequence of an "initial message" sent by a MS, FIG. 14 is a schematic diagram showing the sequence of messages which are generated during inter BSC handovers, FIG. 15 is a flowchart of the steps taken and the messages utilised during the CI determination procedures of embodiments of the present invention, FIG. 16 is a schematic diagram showing the messages sent during the paging procedure used to notify a MS of an incoming call, and FIG. 17 is a flowchart of the steps taken and the messages utilised during the LAI determination procedures of embodiments of the present invention.

Embodiments of the present invention will be described with reference to a cellular mobile radio network operating in accordance with the GSM technical specifications. The GSM technical specifications as published by the European Telecommunications Standards Institute (ETSI secretariat, F-06921 Sophia Antipolis CEDEX, France, e-mail: secretariat@etsi.fr) are hereby incorporated herein by reference.

With reference to FIG. 1, a GSM network comprises a Network and Switching Subsystem (NSS) 1, which connects with a plurality of Base Station Subsystems (BSS) 2. The BSS provide radio communication with mobile stations 3 (only one of which is shown in FIG. 1). The NSS 1 also communicates with the fixed public network 4 (i.e. with the Public Switched Telephone Network—PSTN, and the Integrated Services Digital Network—ISDN). The NSS 1 comprises a number of Mobile Switching Centres (MSC) 5, Home Location Registers (HLR) 6, and Visitor Location Registers (VLR) 6. MSCs perform the function of switches, in a similar manner to PSTN switches, but also deal with the additional functionality required for mobile networks e.g. registration, authentication location updating, international roaming, connection to the PSTN. HLRs contain information on subscribers to the mobile network e.g. location, mobile identity, while VLRs contain a subset of the HLR information which is required when a mobile station is in a particular geographical location.

Each BSS 2 comprises a Base Station Controller (BSC) 8 and a plurality of Base Transceiver Stations (BTS) 9. Referring now to FIG. 2 each BTS 9 comprises one or more elementary transceivers (TRX) 10 and at least one Base Controller Function (BCF) 11. Each TRX 10 can emit and receive radio signals and provides radio coverage over a local area known as a cell. The number of TRXs per cell and the number of cells per BTS is dependent on the traffic capacity that the network operator wishes to cater for.

The radio interface between a mobile station 3 and BTS 9 is standardized within a GSM network. Similarly, the interface between each BTS 9 and its associated BSC 8, by which user data and signalling are exchanged, is also standardized, and is known as the Abis interface. Each BSS 2 communicates with an MSC 5 over a standardized interface known as the A interface.

In GSM networks, user data and signalling are multiplexed across the radio interface, the Abis interface and the A interface. Signalling within the NSS 1, over the A interfaces to the BSCs 8 and with the PSTN 4, is effected through signalling links which utilise signalling schemes based on the SS7 standard. FIG. 3 illustrates some of the protocols utilised in GSM. A number of the protocols have multiple layers, and in many cases messages are transparent to some of the nodes through which they pass, for example some messages from the MS to the MSC will pass transparently through the BTS and BSC. Protocol layers which transparently pass messages through a node are shown as a dashed line in FIG. 3.

Radio Resources Management

This protocol layer is used for paging, radio channel access, ciphering, handover, radio signal control procedures, and radio signal measurements. RR messages pass between the MS and the BSC, and are transparent to the BTS.

Radio Subsystem Management (RSM)

RSM, although a term of this art, is not an official GSM name, and is often referred to by the GSM technical specification which describes these messages i.e. GSM08.58. RSM messages relate to the management of radio resources by the BTS. These messages appear only on the Abis interface and are carried by the LAP D protocol.

Call Management (CM)

The Call Management protocols comprises Call Control (CC), Short Message Service (SMS) and Supplementary Services (SS). CM messages pass transparently from the MS through the BTS and BSC to the MSC.

Mobility Management (MM)

As for CM messages, MM messages pass between the MS and MSC, and are transparent to the BTS and BSC.

BSS Management Application Part (BSSMAP)

BSSMAP messages pass between the BSC and MSC and are used to manage resources at the BSC. These messages are passed across the A interface via MTP (Message Transfer Part) and SCCP (Signalling Connection Control Part) protocols which are both based on the SS7 standard.

Layer 1, the signalling layer of the Abis interface, is digital, usually at a data rate of 2048 kbit/sec with a frame structure of 32×64 kbit/sec time slots [ITU-T G.703]. It is these time slots that are monitored in accordance with embodiments of the present invention.

Layer 2 of the Abis interface is based on a standard ISDN protocol called LAPD (Link Access Procedure on the D-channel). This is defined by CCITT recommendation Q.920 and Q.921 and in Europe by ETS 300125 produced by ETSI. LAPD provides for the identification of the terminal end points of a data link by the use of TEIs in the address field of each frame. GSM has adopted the use of TEIs for the addressing of TRXs by BTS's.

Layer 3 is the layer in which messages are carried, in the Abis interface within the RSM protocols, and on the A interface within the BSSMAP and SCCP protocols.

An overview of a discovery method according to the present invention will now be given, prior to describing this method in greater detail. With reference to FIG. 4, monitoring equipment 12 is utilised to monitor links on both the Abis interface and the A interface of a GSM network. The monitoring equipment 12 comprises probes 13 attached to test points on both the Abis and A interfaces at a BSC site, an HP E4251A Cardcage 14 available from Hewlett-Packard Limited, and an analyser 15, comprising a Hewlett-Packard HP9000 series 800 Unix server, for analysing and correlating the monitored data. A communications link 16 is provided from the analyser 15 so that the results of the auto-discovery of radio elements may be accessed from a remote location. Each probe 13 monitors a particular time slot on a communications bearer on either the Abis or A interface, and is connected to a particular interface card within the Cardcage 14.

The monitoring system 14 is configured to attach a header to each data message monitored by a probe 13. This header comprises a time stamp which records the time at which the monitoring system received the message, event information and a physical identifier, which uniquely identifies the monitored time slot. The event information indicates whether the message has been monitored from, for example, an Abis or an A interface and is recorded for each timeslot by the analyser 15 at the time the probes 13 and monitor system 14 are initially connected to the network. This information may be supplied by the network operator and input to the analyser, or may be deduced by the analyser from messages monitored on each timeslot. The physical identifier attached to the message by the monitoring system may comprise for example the cardcage number of the monitoring system, the interface card number of the cardcage, the bearer number of the communications link being monitored and the time slot number being monitored.

Although the physical identifier attached to the message by the monitoring system allows the time slot on which a message has been monitored to be uniquely identified, a further level of physical identification is required in order to be able to uniquely identify the source or destination of the data message i.e. a TRX. This further level of physical identification is required because within GSM systems it is possible for more than one TRX to send data messages on the same time slot. The final level of physical identification is provided by the TEI which is sent within the layer 2 LAPD. Each time a message is monitored by the monitoring system 14, the analyser 15 extracts the TEI from layer 2 and combines it with information from the header attached by the monitoring system in order to construct a physical identifier as follows:

Physical Identifier: cardcage number; interface card number; bearer number; time slot number; TEI A person skilled in this field will appreciate that alternative monitoring systems may utilise alternative physical identifiers. However, if the network being monitored utilises one timeslot for more than one TRX, the TEI should be used as part of the physical identifier.

An aim of network discovery methods according to embodiments of the present invention is to map each physical identifier allocated by the monitoring system to a monitored TRX to a logical identifier which uniquely identifies the TRX within the logical structure of the monitored cellular mobile radio network. In GSM networks a convenient logical identifier comprises a hierarchical combination of the Location Area Identity (LAI), the Cell Identity (CI) and the TEI for a TRX. The TEI is thus used both as a part of the physical identifier identifying a physical channel and as part of the logical identification of the radio elements within the topology of the mobile network. The hierarchical logical identifier for each TRX is deduced by the analyser 15 by correlating data extracted from monitored messages. There are four basic processes carried out by the analyser 15 as follows:

Process 1 Discovery of TRXs
Process 2 Aggregation of TRXs belonging to the same cell
Process 3 Determination of cell identifier
Process 4 Determination of location area identifier There is no required temporal order in carrying out these processes, and the order in which they are successfully achieved depends on the type of messages which happen to be monitored by the monitoring system 12 and the order in which these messages are monitored. Several of these processes may be carried out in a single step if the appropriate message is monitored.

A key aspect of the discovery method is the correlation, or matching, of pairs of signalling messages, to determine which messages contain common information elements. When two messages contain common information elements it can be deduced that they relate, for example to the same TRX, cell, or LAI. However, because many of the signalling messages, particularly on the Abis interface, do not carry data which uniquely identifies their source or origin, a pair of messages containing common information elements may not necessarily be logically related. In order to overcome this difficulty embodiments of the present discovery method employ a time window when matching messages.

This message matching technique will now be described with reference to FIG. 5. The first message of type A, of a pair of messages received by the monitoring system 12 is time stamped and stored. When a second message of type B is received by the monitoring system 12 its time of arrival is compared with the time stamp of message A, or if at the time of arrival of the B type message, several A type messages are stored, the B type message arrival time is compared with the timestamps of all A type messages. If the difference in time between the arrival of a B type message and the timestamp of a particular A type message is less than a predetermined time window further processing of the two messages occurs. If the time difference between the B type message and a particular A type message is greater than this time window, this particular A type message is discarded. If the time difference between the B type message and all stored A type messages is greater than the pre-determined time window, the B type message is discarded.

If a B type message is within the time window from the arrival of an A type message, the data contained within the B type message is compared to that within the A type message to determine if there are any common information elements. If such common information elements are found, further actions are taken by the analyser 15 which are dependent on the nature of A and B messages, and which will be described in detail below.

If common information elements are not found message B is discarded, but message A is retained for matching with further, later messages of type B arriving within the time window.

An additional, optional, further check on the validity of message matching can be carried out. Rather than accepting a message match as being successful when common information is matched between a message B and one message A, further comparisons with stored messages of type A may be carried out. If the common information element within message B is found within more than one message of type A, within the time window, then these messages are discarded. If, after matching with all messages of type A, the common information element within the B message has been found within only one A message, the message matching is deemed to be successful. Thus, by discarding non unique message matches, greater confidence can be placed in the message matching process. Whether this alternative, more secure, message matching procedure is utilised depends on the relative importance placed by the operator of the discovery method on speed of discovery, level of processing available, and the level of confidence required in the results of the discovery method.

The length of the time window may be different for different message pairs, and should be chosen to be a small multiple of the typical time interval between messages of that type on the network being monitored. In order to choose appropriate time window lengths, messages on the network should be monitored for some time, and the typical intervals between particular messages determined. Time window lengths can then be optimised by trial and error. If time window lengths are too long this will lead to messages being falsely correlated, while if time windows are too short this will lead to an excessive number of messages being discarded and the network discovery method will take an excessively long time to discover the network. The messages monitored to carry out the four processes of the discovery method should in general be chosen to be ones which carry as much network data as possible, but also ones which appear on the network as often as possible, so as to ensure rapid discovery of the network.

Process 1—Discovery of TRXs

Each TRX is served by two physical channels, one along which messages are received, and one along which messages are sent from the TRX. These two channels define a logical link, and the present process determines the relationship between TRXs and links. This is achieved by monitoring pairs of messages, until one pair of messages are determined by the analyser 15 to be passing to and from the same TRX, and therefore to be on the same link. Once such a pair of messages have been identified, the analyser 15 records that the particular TRX (identified by its TEI) is served by a particular link comprising two channels identified by the physical identifiers attached to the messages by the monitoring system 14. Three procedures, each involving the monitoring of different pairs of messages, can be used to carry out the present process. Two pairs of messages are generated during the request for a channel by an MS, and the subsequent allocation of a channel by a BSC. The messages passed, are shown schematically in FIG. 6. The MS commences the sequence of messages by sending a request message to the network for a traffic channel. This initial message generates pairs of messages between the BTS and the BSC on the Abis interface, and it is these pairs of messages that are sought by the present monitoring system. The third pair of messages that can be utilised in this process is generated during the channel release procedure.

Access request procedure

The first pair of messages that can be utilised are sent during the access request procedure and belong to the RSM protocol. The first (type A) message is the CHANnel ReQuireD message [GSM TS 08.58, 8.5.3] and the second (type B) message is the IMMediate ASSIgnment CoMmanD message [GSM TS 08.58, 8.5.6]. CHAN RQD is sent from the TRX to the BSC, while IMM ASS CMD is sent from the BSC to the TRX. The IMM ASS CMD message carries one of three possible RR assignment commands: IMMEDIATE ASSIGNMENT [GSM TS 04.08, 9.1.18], IMMEDIATE ASSIGNMENT EXTENDED [GSM TS 04.08, 9.1.19], and IMMEDIATE ASSIGNMENT REJECT [GSM TS 04.08, 9.1.20]. The common information element, searched for by the analyser 15, between the CHAN RQD message and any one of the three IMM ASS CMD messages is a request reference element [GSM TS 08.58, 9.3.19]. This request reference comprises a random access part [GSM TS 04.08, 9.1.8] (a small random number of between 2 and 5 bits) which identifies the access request, and an absolute frame number [GSM TS 04.08, 10.5.2.38] (a modulo 42432 number related to the absolute time of the frame). Although the absolute frame number is a large number, there is still a danger that two unrelated messages will be monitored containing the same absolute frame number, for example if two requests were made from different TRXs at the identical absolute time. Hence when matching messages the analyser 15 employs the whole of the request reference element, including both the random access part and the absolute frame number in order to avoid false matches. Once the monitoring system receives a CHAN RQD message and any one of the IMM ASS CMD messages within a predetermined time window of each other, and these messages contain identical request reference elements, then the analyser 15 will record that the two physical identifiers attached to these two messages belong to the same TRX and thus that the two monitored physical channels belong to the same logical link. 45 milliseconds has been found to be a suitable time window for this message pair.

A disadvantage in utilising the access request procedure to identify TRX links is that these access request messages only appear on TRXs which have a CCCH (Common Control CHannel). CHAN RQD is sent to a TRX on the Random Access Channel (RACH) and the TRX will respond with a IMM ASS CMD message on the downlink CCCH. The access request procedure can thus only be used to discover links that belong to TRXs which employ common control channels, and cannot be used to discover links that belong to TRXs which employ only traffic channels.

Channel activation procedure

The second procedure utilises one type A message and one of two possible messages of type B. These messages, all belonging to the RSM protocol, are respectively the CHANnel ACTIVation message [GSM TS 08.58, 8.4.1], the CHANnel ACTIvation ACKnowledge message [GSM TS 08.58, 8.4.2], and the CHANnel ACTIvation Negative ACKnowledge message [GSM TS 08.58, 8.4.3]. CHAN ACTIV is sent from the BSC to the TRX, the other two are sent in the opposite direction. The CHAN ACTIV NACK message is sent only if the TRX fails to allocate the required channel otherwise the CHAN ACTIV ACK message is sent. The common information element that is sought between the CHAN ACTIV message and one of the CHAN ACTIV ACK or the CHAN ACTIV NACK messages is the channel number [GSM TS 08.58, 9.3.1]. This number is an octet which identifies the channel to be allocated i.e. the channel type, time slot, and potentially sub time slot. Again, once the monitoring system has identified identical channel numbers within two of these messages received within a pre-defined time window of each other, the physical identifiers attached to the messages can be associated with a particular TRX.

The use of this procedure has the advantage that all TRXs send and receive these messages, and thus the links for all TRXs can be discovered by monitoring these messages. A disadvantage in using the channel activation procedure is that the channel number can only assume 120 different values, thus the same value is relatively frequently utilised within channel activation messages which relate to different TRXs. It is thus particularly important to correctly determine a time window value to be used in the message matching procedure so as to avoid incorrect association between TRXs and physical channels. 20 milliseconds has been found to be a suitable time window for this message pair.

Channel release procedure

Two messages are utilised in the channel release procedure for TRX link discovery. These are RF CHANnel RELease [GSM TS 08.58, 8.4.14] sent from the BSC to the TRX and RF CHANnel RELease ACKnowledge [GSM TS 08.58, 8.4.19] sent from the TRX to the BSC. The common information element sought within these two messages is the same as that for the channel activation procedure described above i.e. the channel number. 10 milliseconds has been found to be a suitable time window for this message pair. Use of the channel release procedure has the same advantages and disadvantages as use of the channel activation procedure.

The messages utilised in process 1, TRX discovery procedures are shown in FIG. 7.

Process 2—Aggregation of TRXs belonging to the same cell

This process is often required because for many GSM-type networks it is not possible to successfully carry out processes 3 and 4, the determination of respectively the Cell Identifier (CI) and Location Area Identifier (LAI), for all TRXs within one cell.

However, if TRXs belonging to the same cell have been aggregated (either before or after determination of CI and LAI) then the CI or LAI determined for any TRX within that cell can be assigned to the other TRXs known to belong to the same cell.

Whether or not process 2 is required in the discovery procedure is dependent on the choice of channel allocation strategy that has been made by the network operator. The network operator may choose to use the same channel allocation strategy throughout his network, or may choose to use different channel allocation strategies in different parts of the network. At any given moment the available Traffic Channels (TCHs) within a BSC are either allocated to the exclusive use of an MS, or form part of a pool of idle channels from which a channel is drawn when required. There are a number of different circumstances in which a channel needs to be allocated, for example call set up, location updating, handover, and these different situations require different radio channel resources. However, the MS initially gives only a rough description of its requirements for a traffic channel, thus a strategy for channel allocation is required. GSM network operators have a choice of three channel allocation strategies.

These strategies are described with reference to FIG. 8. Very Early Assignment (VEA) consists in allocating a traffic channel at the initial assignment. This strategy can be very inefficient in its use of radio resources since a full traffic channel may be allocated when not required. Early Assignment (EA) comprises allocating a Standalone Dedicated Control Channel (SDCCH) and then subsequently allocating a TCH as soon as it is known for sure that this type of channel will be required. Off Air Call Set Up (OACSU) comprises allocating an SDCCH initially, then waiting until the called party has answered before attempting the subsequent assignment of a TCH. This strategy may result in a significant delay in connecting the parties, once the called party has answered, dependent on the availability of TCHs at this instant.

If VEA is employed in the part of the network being monitored, then process 2 of the discovery method is not necessary since sufficient signalling messages will be passed to and from each TRX for processes 3 and 4 to determine the CI and LAI for each TRX. However, even where VEA is employed process 2 may still be utilised in the discovery method, although not absolutely necessary, in order to speed up the discovery method.

If EA or OACSU are utilised it is common practice amongst network operators to configure TRXs within a cell so that SDCCHs are very often (or indeed always) assigned to the same, single TRX within a cell. Furthermore, in general this same TRX is chosen as the TRX to carry the CCCH for the cell. In this case processes 3 and 4 can determine the CI and LAI only for this one TRX within the cell, and process 2 is required to allow the CI and LAI to be assigned to the other TRXs within the same cell.

When a BSC allocates a new TCH, it will communicate with a first TRX handling SDCCH and then it will communicate with a second TRX on which the new TCH is to be established. In some circumstances these two TRXs may be the same. Some of the messages sent to the two TRXs by the BSC during the setting up of the new TCH contain common information elements and, if these can be identified, the two TRXs can be determined to be within the same cell. Two sets of messages have been identified which can be used to aggregate TRXs belonging to the same cell. One set can be utilised only when ciphering has been implemented by the network operator, and the other set can be utilised whether or not ciphering has been implemented.

Procedure requiring ciphering to be implemented

When ciphering is implemented, all data sent over the radio path is encrypted by an algorithm termed A5 [GSM TS03.20] which utilises a key termed Kc. This key is 64 bits long and is calculated independently by both the MS and the network each time a radio connection is set up. The key Kc is never transmitted over the radio path but is calculated at the MS, and within the network using a further algorithm termed A8 [GSM TS03.20].

Two inputs are required by the algorithm A8 in order to generate the key Kc. The first, a further key termed Ki is stored by both the SIM, within the MS, and by the Authentication Centre (AuC) within the network. The second input required by A8 is a random number RAND created randomly by the network and sent to the MS each time a radio connection is set up. Once the key Kc has been calculated, this is sent to the TRX so that it can decipher coded radio messages received from the MS. In order to identify, and to aggregate, the SDCCH TRX and the TRX on which the new TCH is to be allocated, the ENCRyption CoMmanD [GSM TS 08.58 8.4.6] and CHANnel ACTIVation [GSM TS 08.58 8.4.1] messages are monitored.

Both messages belong to the RSM protocol and they are sent from the BSC to a TRX (see FIG. 9). The ENCR CMD message is sent, on the Abis interface, to the TRX handling the SDCCH after the access request and before the full call information and carries the ciphering key Kc calculated by the network. The same key is carried by the CHAN ACTIV message that is sent to the TRX which is assigned the required TCH once the BSC knows which type of call is required by the MS. The common element sought in these two messages is the ciphering key Kc, which is carried within the Encryption Information [GSM TS 08.58, 9.3.7] element of the messages. Because this ciphering key is several octets long, it is very unlikely that the same key will be used by more than one radio connection during the same time window. Hence, once a pair of ENCR CMD and CHAN ACTIV messages have been monitored which contain the same ciphering key Kc, and which have been sent to two different TRXs, these two TRXs are recorded by the analyser as belonging to the same cell.

The time window utilised for the matching of these messages needs to be relatively long since a number of procedures are carried out in the time between these two messages (eg call set up) so that the typical interval between them is long. Two seconds has been found to an effective time window.

Procedure not requiring ciphering to be implemented

The following technique can be utilised to aggregate TRXs regardless of whether ciphering has been implemented by the network operator. The pair of messages employed are the CHAN ACTIV [GSM 08.58, 8.4.1] message and the ASSIGNMENT COMMAND [GSM 04.08, 9.1.2] message. These messages are sent from the BSC to a TRX on the Abis interface. The assignment command message is part of the RR protocol and is carried within a DATA REQuest message [GSM 08.58, 8.3.1] which itself is part of the RSM protocol. The assignment command message is transparent to the receiving TRX, which simply forwards it on to the relevant MS.

The CHAN ACTIV message, as discussed above, is sent to the new TRX on which the new TCH is to be allocated. Once the new TCH has been allocated, the BSC sends a DATA REQ message, containing an assignment command, on the Abis interface to the old TRX (the one handling the SDCCH), in order to give the MS sufficient information to switch to the new TCH, this is shown schematically in FIG. 10. The CHAN ACTWV message and the assignment command message both contain the channel number [GSM TS 08.58, 9.3.1]. This is the same common information element as utilised in two of the process 1 procedures for discovering TRXs described above. The matching of this information element between these messages occurs in accordance with the message matching technique described above, with reference to FIG. 5. Once the same channel number element has been identified within two of these messages, within the requisite time window, the two TRXs are recorded by the analyser 15 as belonging to the same cell. Since, as stated above, the channel number element can assume only 120 different values, the time window value for this matching procedure must be carefully chosen. 30 milliseconds has been found to be a suitable time window for this message pair.

In order to improve the accuracy of TRX aggregation, a further common information element which may be present in these messages, can be utilised. If the network operator requires compatibility with GSM phase 1 equipment, a channel identification element [GSM TS 08.58, 9.3.5] will be present not only in the ASSIGNMENT COMMAND message but also in the CHAN ACTIV message and thus may used for matching purposes. The channel identification element provides the MS with information regarding the absolute frequency or frequency hopping parameters required for the TCH which the MS will switch to. The channel identification element has two parts, the channel description [GSM TS 04.08, 10.5.2.5] and the mobile allocation part [GSM TS 04.08, 10.5.2.21]. The channel description part and mobile allocation part of the channel identification element in CHAN ACTIV messages are always together, however these two parts are in separate sections of ASSIGNMENT COMMAND messages. Thus when matching channel identification elements each part of the element must be matched separately. When the channel identification element is utilised for matching messages, a match is not deemed to be successful unless both parts of the channel identification element match. When employing both the channel identification element and the channel number element to aggregate TRX s, aggregation is only carried out when both elements are successfully matched within their respective messages.

Directed Retry

Both of the procedures described above for carrying out process 2 to aggregate TRXs assume that the TRX on which the new TCH is assigned is within the same cell as the SDCCH TRX. This is not always the case. Phase 2 of the GSM standard provides for the assignment of a TCH to an MS from a TRX in a cell other than the current cell of the MS. This feature is termed Directed Retry [GSM TS 03.09, 11]. The result of such a directed retry is shown schematically in FIG. 11. Clearly, if the new TCH for the mobile is assigned to a TRX in a different cell, it would be incorrect to aggregate the SDCCH TRX and the new TRX as belonging to the same cell. This problem can be avoided by the network discovery method by monitoring a further information element, the activation type [GSM TS 08.58, 9.3.3] within the CHAN ACTIV message which indicates when a directed retry is occurring.

A directed retry is initiated when the serving cell chosen by the MS in idle mode is different from the serving cell chosen by the network. In this case, in phase 2 implementations of GSM, rather than performing an assignment to the MS chosen cell and then a subsequent handover to the network chosen cell, a handover is performed immediately, prior to assignment. In this case, the activation type element of the CHAN ACTIV message will indicate that activation is related to inter-cell channel change. Thus both procedures for carrying out process 2 TRX aggregation monitor for this indication within the activation type element, and if found discard the related messages as belonging to a directed retry. Although such messages cannot be used to determine that the two TRX s involved belong to the same cell, they do indicate that the two TRXs definitely do not belong to the same cell. This information may be usefully employed by the analyser 15 in confirming the correct aggregation of TRXs.

FIG. 12 is a flowchart which schematically shows the procedure carried out by the monitoring equipment during Process 2, aggregation of TRXs.

Process 3—Determination of Cell Identity

The Cell Identity (CI) is a value of fixed length with two octets, which identifies the cell within its location area [GSM TS 08.08, 3.2.2.27]. The CI does not uniquely identify the cell within the network, unless it is concatenated with the LAI to form the CGI (Cell Global Identification). In some cases the GCI can be determined at the same time as the CI, so that process 4 (Determination of Location Area Identifier) is not required.

Two procedures can be used to correlate CIs with TRXs, one based on monitoring messages containing "initial messages" sent by an MS during the channel assignment process, and the other based on monitoring handover requests. Both these procedures require messages on the A interface to be monitored in addition to messages on the Abis interface since the CI does not appear in signalling messages on the Abis interface.

"Initial Message" Procedure

When a request from an MS for a channel assignment has been accepted by a BTS, the BTS sends the MS information regarding the allocated channel on the downlink CCCH. When the MS has received this information, the first action it takes on the new channel is to establish a link layer connection for signalling messages on the new channel. This is achieved by sending a SABM (Set Asynchronous Balanced Mode) frame. The SABM frame itself carries a layer 3 signalling message, termed the "initial message" [GSM TS 04.08], which is "piggybacked" onto the SABM frame.

Five different initial messages are allowed by the GSM specifications, which messages each carry data related to the reason the initial access was triggered. The five possible reasons for triggering an initial message are 1) a response to a paging request, 2) normal or periodical location updating or an IMSI attach, 3) an IMSI detach, 4) CM re-establishment request and 5) service request (e.g. call set up, SMS, Supplementary Service Management). In each case the initial message sent by the MS is incorporated into two further messages, the first on the Abis interface and the second on the A interface. The present procedure utilises the initial message element within these messages as the common information element to achieve matching between the messages. In greater detail and with reference to FIG. 13, the SABM frame (with piggybacked initial message) sent by the MS to the TRX on the radio interface causes the BTS to send an RSM ESTablish INDication message [GSM TS 08.58, 8.3.6] which incorporates the initial message to the BSC on the Abis interface. This EST IND message is the first monitored message looked for by the present procedure. Receipt of the EST IND message at the BSC causes the BSC to compile a COMPLETE LAYER 3 INFORMATION message [GSM TS 08.08, 3.2.1.32] which incorporates the initial message and further information including the CI or in some cases the GCI for the cell served by the TRX which generated the EST IND message. This COMPLETE LAYER 3 INFORMATION message is passed from the BSC to the MSC, and is the second monitored message. By monitoring these two messages, and matching the initial message elements found within each, within a time window as described above, the CI for a particular TRX on a particular channel (labelled by the physical identifier given by the monitoring system) can be identified. 30 milliseconds has been found to be a suitable time window for this message pair. Depending on the number of other steps within the network discovery method that have been successfully carried out, the CI can be allocated to a TRX identified by its TEI (Process 1), and can also be allocated to other TRXs aggregated as belonging to the same cell (Process 2).

Preferably, the whole of the initial message is utilised as the common information element looked for when matching messages according to this procedure. However, all five of the initial messages types contain a mobile identity element [GSM TS 04.08, 10.5.1.4] (eg. IMSI or TMSI) and this mobile identity element alone can form the common information element.

Handover Procedure

This procedure identifies CIs and allocates them to particular TRXs by monitoring messages which are generated during inter BSC handovers, i.e. handovers of the MS between different BSCs via an MSC. With reference to FIG. 14 when an inter BSC handover is initiated the MSC 21 serving the two BSCs 17 and 19 sends a HANDOVER REQUEST message [GSM TS 08.08, 3.2.1.8] to the BSC 17 serving the BTS 18 in which the target cell for the handover is located. This HANDOVER REQUEST message is sent within the BSSMAP protocol on the A interface, and contains the CI for the cell presently serving the MS, and the CI for the target cell to which the MS is to be handed over. By monitoring two different messages (one for the serving cell and one for the target cell, as described below) on the Abis interface, and matching each of these with the HANDOVER REQUEST message on the A interface, both the serving cell CI and the target cell CI can be determined and allocated to TRXs.

Unfortunately, the HANDOVER REQUEST message does not contain a common information element that can be matched with the relevant messages on the Abis interface, so a preliminary matching between the HANDOVER REQUEST message and a further message on the A interface must be carried out. This message is the HANDOVER REQUEST ACKnowledge message [GSM TS 08.08, 3.2.1.10] which is sent from the BSC 17 to the MSC 21 within the BSSMAP protocol in response to the HANDOVER REQUEST message. Within the SCCP layer of a message sent on the A interface there is an SCCP header which comprises routing information including source and destination addresses in terms of point codes. In any particular message between a BSC and MSC these point codes comprise source and destination local references dependent on the direction in which the message has been sent. These local references remain the same for the duration of the SCCP connection and, since a HANDOVER REQUEST message and the corresponding HANDOVER REQUEST ACKnowledge message are sent on the same SCCP connection, can be used to match these messages. Thus the SCCP header information is monitored by probes 13 on the A interface and the analyser 15 is arranged to match HANDOVER REQUEST messages and HANDOVER REQUEST ACKnowledge messages having the same source and destination local references. Further details of the tracking of SS7 SCCP addressing information on the A interface can be found in co-pending U.S. patent application Ser. No. 08/851 041, which is incorporated herein by reference.

Although the HANDOVER REQUEST ACK message contains common information elements that can be matched with messages on the Abis interface as described below, it does not contain the CI for the serving or target cells. Thus once matching with Abis messages has been successfully performed, the CI's are acquired from the associated HANDOVER REQUEST message.

Serving Cell CI

The serving cell CI can be determined by matching common information elements between the HANDOVER REQUEST ACK message and an RR-HANDOVER CMD message sent from the serving BSC 19 to the serving BTS 20. This HANDOVER COMMAND [GSM TS 04.08, 9.1.15] is sent on the Abis interface within a DATA REQUEST message of the RSM protocol. The HANDOVER CMD is also contained within the HANDOVER REQUEST ACK, thus allowing matching between the DATA REQUEST message and the HANDOVER REQUEST ACK message. Since the whole of the HANDOVER COMMAND is included within both messages, this forms the common information element and matching is performed between all elements of the HANDOVER COMMAND. If the HANDOVER COMMAND is correctly matched within a time window (2 seconds has been found to be effective) as described above, then the serving cell CI carried within the HANDOVER REQUEST message (matched to the HANDOVER REQUEST ACKnowledge message) can be allocated to the serving TRX within the BTS 20.

Target Cell CI

When the MS is detected at the target BTS 18, a HANDOVER DETECTION [GSM TS 08.58 8.4.7] message is sent over the Abis interface on the RSM protocol from the target BTS 18 to the BSC 17. Both the HANDOVER DETECTION message and the HANDOVER REQUEST ACK message contain a channel number (giving the channel type and time slot allocated to the MS within the target cell), and this common information element is utilised to match these messages within a time window (3 seconds has been found to be effective). Matching of the messages allows the target cell CI (within the HANDOVER REQUEST message matched to the HANDOVER REQUEST ACK message) to be allocated to the serving TRX within the BTS 18.

FIG. 15 is a flowchart which schematically shows the procedure carried out during Process 3, determination of CI.

Again, the CIs for the target and serving cells can be allocated to other TRXs known to be within the same cell via a Process 2, TRX aggregation step.

Process 4—Determination of Location Area Identity

As stated above during the description of Process 3 (Determination of Cell Identity), the COMPLETE LAYER 3 INFORMATION message may contain a GCI rather than simply a CI. If this is the case, the LAI may be determined from the GCI without any further information. Alternatively, if only the CI is found within the COMPLETE LAYER 3 INFORMATION message, or if Process 3 has not yet been carried out, one of the following three procedures may be utilised to determine the LAI. The first procedure is based on monitoring paging messages, and requires matching of messages between the A and the Abis interfaces. The second and third procedures are both based on monitoring location updating messages, and do not require matching of information between messages, but simply the selection of the correct message, and the extraction of the LAI.

Paging procedure

The location area is a concept utilised by OSM type networks which seeks to strike a balance between the number of cells which must be paged to locate a particular MS, and the amount of signalling traffic generated by MSs updating the fixed part of the network with their current location. The location area is a logical grouping of a plurality of cells having a common location area identification. An MS only initiates a location updating process when it determines that it has changed location areas, thus reducing the amount of location updating network traffic. When the network needs to route an incoming call to a particular MS it will only need to transmit a paging message to the cells within the relevant location area, rather than to all cells within the network.

With reference to FIG. 16, when the fixed network needs to notify an MS of an incoming call, the MSC 5 sends a PAGING message [GSM TS 08.08, 3.2.1.19] within the BSSMAP protocol on the A interface to the BSCs 8 covering the location area in which the MS is known to be. The paging message is specific to one MS, and contains information regarding the cells in which the PAGING message must be broadcast, and may contain the LAI. The cells within a location area are generally served by one BSC 8 but in some cases may be served by more than one BSC as shown in FIG. 16. The only restriction imposed by the GSM specifications regarding which cells belonging to a location area, is that all cells must be under the control of a single MSC 5. Each BSC 8 receiving the PAGING message then sends a PAGing CoMmanD message [GSM TS 08.58, 8.5.5] within the RSM protocol on the Abis interface to each TRX having a PCH (Paging Channel) within the relevant location area. Only one TRX within a cell will be utilised to broadcast the PCH.

The PAGING message and the PAGing CoMmanD message both contain a common information element, namely the mobile identity element of the MS being paged. This mobile identity element will be the IMSI, or if a TMSI has been established between the MS and the network, the TMSI is utilised for security reasons. Thus the monitoring system 14 monitors for PAGING messages on the A interface, and PAGing ComManD messages on the Abis interface, and (if the PAGING message contains an LAI) attempts to match the mobile identity elements found within these messages within a time window as described above. The time window used within this paging procedure may safely be very long because an IMSI is unique globally and a TMSI is unique within a particular location area. Thus it is unlikely, if two identical TMSI'S are found, that they will relate to different MSs. Furthermore, because paging messages are often repeated if there is no response from the MS it is advantageous to utilise a long time window. It has been found that time windows of up to one minute are effective.

When a match has been found the analyser 15 is able to correlate the LAI found within the PAGING message with the TRX to which the matching PAGing ComManD message has been sent. As stated above, PAGing ComManD messages will only be sent to TRXs which broadcast PCHs. However, once Process 2 (Aggregation of TRXs belonging to the same cell) has been carried out the LAI allocated to a TRX transmitting a PCH can be allocated to all other TRXs within the same cell. Furthermore, by matching the PAGING message on the A interface with each of the PAGing ComManD messages on the Abis interface the LAI for all cells within the location area may be determined.

Location Updating Procedures

A number of messages sent during location updating can be utilised to determine the LAI for a TRX without the need to perform message matching. Two of these messages are of the "initial message" type sent from the MS to the fixed network, and the third one is a message sent from the fixed network to the MS in response to a location updating request.

The IMSI attach [GSM TS 04.08, 4.4.3] is a specific type of initial message which is sent when an MS re-registers within a location area in which it had previously been registered. This IMSI attach message is incorporated within an RSM establish indication message and is sent by the serving TRX over the Abis interface to the serving BSC. For the present purposes the important aspect of the IMSI attach message is that it contains the LAI in which the MS is located. Thus the LAI can be correlated with the TRX that sent the establish indication message without needing to perform any message matching. Unfortunately for the present purposes, the IMSI attach, and its corresponding detach procedure is not mandatory within GSM type networks, thus the network operator may choose not to implement this procedure.

A second form of initial message which may be monitored to determine LAI without message matching is that of call re-establishment. The call re-establishment procedure [GSM TS 04.08, 4.5.1.6] can be considered as an emergency, MS triggered, handover procedure which is implemented when a call connection is suddenly lost. In these circumstances the MS sends a RE-ESTABLISHMENT REQUEST which is incorporated by the TRX into an RSM establish indication message, and passed to the BSC on the Abis interface. In cases where the TMSI is used as the mobile identity, the LAI is also incorporated into this message in order to unambiguously identify the MS. This call re-establishment facility is also not mandatory so network operators may choose not to implement it.

A third location updating message that can be monitored to determine an LAI without message matching is the LOCATION UPDATING ACCEPT message [GSM TS 04.08, 9.2.13]. The LOCATING UPDATING ACCEPT message is sent by the serving MSC in response to a LOCATION UPDATING REQUEST message [GSM TS 04.08, 9.2.15] sent by the MS. The LOCATION UPDATING ACCEPT message is transparent to the BTS which simply passes it on to the relevant TRX within a DATA REQUEST message. By monitoring for this message on the Abis interface, which contains the LAI of the MS's current location, this LAI can be allocated to the TRX to which the message has been sent.

FIG. 17 is a flowchart which schematically shows the procedure carried out during Process 4, determination of location area identifier.

System Information Messages

Occasionally a configuration parameter, for example the LAI of a cell, may be changed by the network operator, and a system information message will be sent out giving details of such a change. The frequency of these messages will depend on the maturity of the operator's network, but typically configuration parameters are likely to be changed only over long time scales such as a week or a month and are thus not particularly useful for the present discovery method. However, the following three messages could possibly be sent on the Abis interface 1) SACCH INFO MODIFY [GSM TS 08.58, 8.4.20] 2) BCCH INFOrmation [GSM TS 08.58, 8.5.1] and 3) SACCH FILLING [GSM TS 08.58, 8.6.2]. Monitoring of any of these three messages will enable the CI and LAI for a particular TRX to be determined from the message content without requiring matching to any other messages.

What is claimed is:

1. A network discovery method for determining information about a cellular mobile radio network comprising a fixed part having switching elements and radio elements providing radio coverage in a plurality of cells, each cell having at least one said radio element, and mobile stations for communicating with said fixed part via the radio elements, the method comprising:

monitoring signalling messages passed between the radio elements and the switching elements, selecting at least one signalling message in accordance with occurrence of the signalling message within a predetermined time window and in accordance with a predetermined selection criteria, extracting data from said at least one signalling message, correlating said extracted data with previously extracted data and, repeating said selecting, extracting and correlating steps until each monitored radio element is identified with respect to other network entities.

2. A network discovery method as claimed in claim 1, wherein said selecting step comprises selecting a pair of related messages.

3. A network discovery method as claimed in claim 2, wherein the predetermined selection criteria for selecting a pair of messages are:

i) each message is of a different message type, and ii) the messages contain at least one information element in common.

4. A network discovery method as claimed in claim 3, comprising a further matching step in which the common information element in each of the messages is compared and data from the pair of messages is only utilised in said correlating step if the common information element in each message is identical.

5. A network discovery method as claimed in claim 4, wherein at least three messages are selected and wherein one message is matched to a plurality of messages of the same message type.

6. A network discovery method as claimed in claim 2, wherein data from a pair of messages is only utilised in said correlating step if the messages are monitored within a predetermined time period of each other.

7. A network discovery method as claimed in claim 1, wherein the cells are logically grouped into location areas and each radio element is uniquely identified by the cell within which it resides, and the location area within which the cell resides.

8. A network discovery method as claimed in claim 1, wherein signalling messages passed between two switching elements are also monitored.

9. A network discovery method as claimed in claim 1, wherein the cellular mobile radio network is of the GSM type and messages are monitored across the Abis interface between radio elements and switching elements.

10. Apparatus for identifying the relationship between radio elements and other network entities within a cellular mobile radio network, the network comprising a fixed part having switching elements and radio elements providing radio coverage in a plurality of cells, each cell having at least one said radio element, and mobile stations for communicating with said fixed part via the radio elements, the apparatus comprising:

probe means for monitoring signalling messages passed between an identified one of the radio elements and the switching elements, extracting means for extracting data from at least one predetermined signalling message selected in accordance with occurrence of the signalling message within a predetermined time window, and analysis means for determining from extracted data a relationship between the monitored radio element and other network entities.

11. Apparatus as claimed in claim 10, wherein the extracting means extracts data from related pairs of signalling messages, and the analysis means compares at least a part of the extracted data and, if a match is found between such compared data, records a relationship between the monitored radio element and another network entity.

12. Apparatus as claimed in claim 11, wherein the probe means attaches to each monitored message an indication of the time at which the message was monitored and the analysis means only utilise data from pairs of messages which are monitored within a predetermined time period of each other.

13. Apparatus as claimed in claim 12, wherein the predetermined time period is substantially equal to the expected interval between the particular pair of messages monitored.

14. Apparatus as claimed in claim 10, wherein the probe means attaches to each monitored message a physical identifier which identifies the physical channel on which the message has been monitored.

15. Apparatus as claimed in claim 14, wherein the analysis means builds a logical identifier, identifying a particular radio element, from data from monitored messages and relates this logical identifier to the physical identifier provided by the probe means.

16. Apparatus as claimed in claim 10, wherein the relationship between monitored radio elements, cells and location areas comprising logically grouped cells, is determined.

17. Apparatus as claimed in claim 10, wherein the analysis means determines for each monitored radio element the two physical channels on which messages are passed to and from the radio element.

18. Apparatus as claimed in claim 10, wherein the analysis means determines which radio elements are within the same cell and allocates cell related information determined for any one radio element within the cell to the other radio elements within the same cell.

* * * * *